June 26, 1962 W. M. DAY 3,040,649
COFFEE PERCOLATOR
Filed Sept. 6, 1960 2 Sheets-Sheet 1
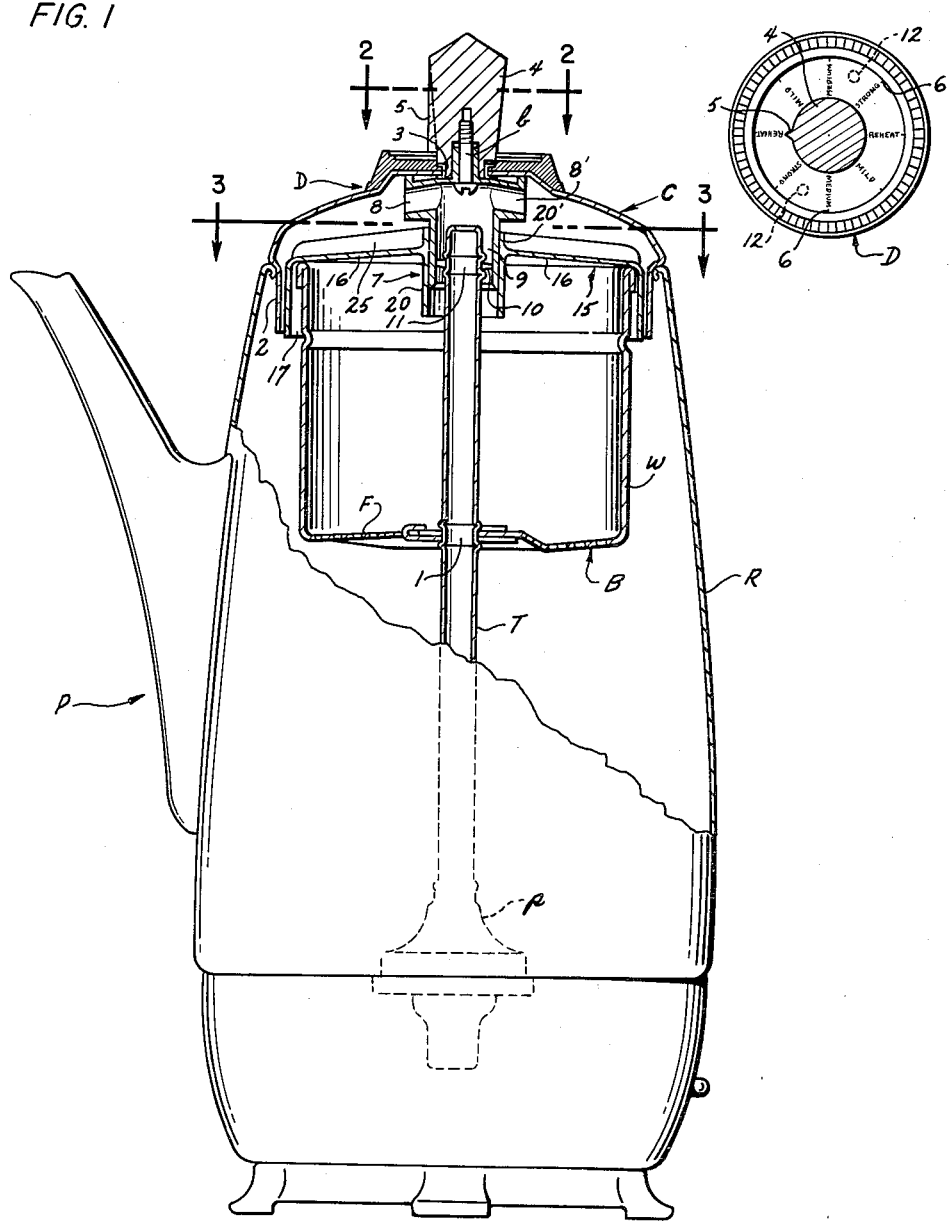
INVENTOR.
WILLIAM M. DAY
BY
Lindsey, Prutzman and Hayes
ATTORNEYS June 26, 1962      W. M. DAY      3,040,649
COFFEE PERCOLATOR Filed Sept. 6, 1960      2 Sheets-Sheet 2

INVENTOR.
WILLIAM M. DAY
BY
Lindsey, Prutzman and Hayes
ATTORNEYS 3,040,649
COFFEE PERCOLATOR
William M. Day, Farmington, Conn., assignor to Landers, Frary & Clark, New Britain, Conn., a corporation of Connecticut
Filed Sept. 6, 1960, Ser. No. 54,222
5 Claims. (Cl. 99—312)

The present invention relates to coffee makers of the percolator type, and more particularly to improved liquid distributing apparatus for controlling the characteristics of the brew to be prepared.

It is a primary object of the invention to provide improved liquid distributing apparatus in a percolator or the like with which coffee brew may be reheated without having to remove the coffee grounds and yet without materially affecting the taste of the reheated brew.

It is also an aim of the invention to provide distributing apparatus which permits selective brewing of coffee over a wide range of coffee strengths while enabling the brew to be reheated without removal of the coffee grounds.

Another object of the invention is to provide such distributing apparatus having a single external control for selecting the desired brew strength as well as the desired brew reheat.

A further object of the invention is to provide such a novel liquid distributing apparatus which is economically fabricated, durable and reliable in use and easily controlled.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a side elevational view of a coffee percolator partially broken away and partially in section and showing a preferred embodiment of the liquid distributing apparatus of this invention;

FIG. 2 is a top plan view of the external adjustment means of the distributing apparatus, taken substantially along the line 2—2 of FIG. 1;

Figure 3:
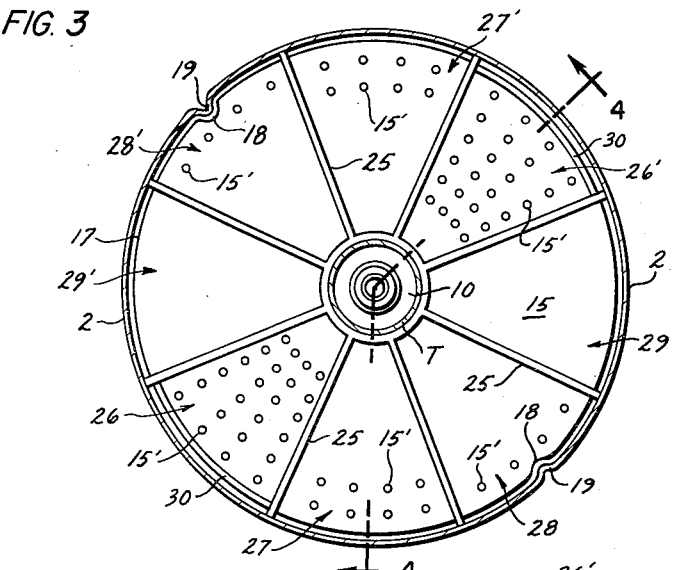
FIG. 3 is a sectional view taken substantially along the line 3—3 of FIG. 1 and showing a top plan view of the liquid flow distributor.

In FIG. 1 there is shown an electric coffee percolator P from which the handle has been removed and having a liquid receptacle R. A fountain tube T is provided with a pump p at its lower end (shown in phantom only) and extends upwardly to the top of the receptacle R. A suitable pump assembly is disclosed in copending application of Eugene S. Dombrowik Serial No. 807,432 filed April 20, 1959. The basket B provides a cylindrical wall W supported by a perforated floor F which is centrally apertured and retained at its inner circular edge within the groove of a corrugation 1 intermediate the ends of the tube T.

The open top of the receptacle R is normally closed by a cover C which provides a depending circular wall 2 at its outer edge for extending within the receptacle R to restrain the cover C therein and for positioning the cover relative to the liquid flow distributing means of the distributing apparatus as will be explained.

The cover C is preferably centrally apertured where its inner circular edge, together with the inner circular edge of an overlying indicator dial D, are secured together between the upper and lower outwardly extending circular flanges of a bearing member 3. Further relative stability between the cover C and dial D may be provided by an upstanding cover boss and dial recess arrangement 12, indicated in dotted line in FIG. 2. A knob 4 formed of suitable heat insulating material is rotatably mounted on cover C with its lower end of reduced diameter received within the bearing member 3 and provides an indicator 5 extending outwardly therefrom for selective alignment with circumferentially spaced indices 6 (FIG. 2) inscribed or otherwise carried on the upper surface of the indicator dial D.

Generally T shaped spigot 7 is secured at its upper end by a bolt b to the lower end of the knob 4 for rotation therewith, and provides a pair of oppositely and radially extending liquid outlets 8, 8′ adjacent the upper end of a downwardly opening liquid inlet 9. The upper tip of the fountain tube T is received within the inlet 9 of the spigot 7 and resilient annular liquid seal 10 is secured at its inner edge within the groove of a corrugation 11 adjacent the tip of the tube T, where it extends radially to slidably contact the inner surface of the spigot inlet 9 to permit relative vertical movement between the spigot 7 and tube T when the cover C is being removed or placed over the receptacle top.

When liquid is circulated via the pump p through the tube T, it is discharged at the outlets 8, 8′ of the spigot 7 in opposite radial directions upon the segmented upper surfaces of a cap-shaped liquid flow distributor 15, supported by the upper edge of the basket wall W. As most clearly seen in FIGS. 3–5, the distributor 15 is a unitary structure preferably molded of a rugged and heat resisting plastic material, such as polypropylene, for example. It provides a liquid receiving plate portion 16, dimensioned to cover the open end of the basket B and has a depending wall 17 overlying the upper end of the basket wall W. The plate portion 16 is apertured at its center where it is provided with an axially extending annular wall or sleeve 20 which fits around the outer surface of the inlet 9 of the T spigot 7.

The distributor 15 and the cover C are rotationally positioned relative to one another, as best seen in FIG. 3, by the provision of oppositely arranged indentations 18 in the distributor depending wall 17 being mated with similar indentations 19 in the depending wall 2 of the cover C when assembled as in FIG. 1. Consequently, indices 6 on the dial D will always correspond to the relative position of the distributor 15, and the spigot 7 may be positioned relative to the distributor 15 with reference to the indicator portion 5 on the spigot operating knob 4.

Extending along plate 16 from the upper end of sleeve 20 are eight circumferentially and equally spaced radial walls 25, the outer ends of which extend past the outer edge of the plate portion 16. The radial walls 25 together with the upper surfaces of the plate portion 15 and the center wall 20 define eight equal pie-shaped segments or liquid flow paths. Six of the segments are provided with plate perforations 15′ and are arranged according to the number of perforations 15′ they contain into three pairs of oppositely and radially extending segments for receiving liquid from the oppositely and radially extending outlets 8, 8′ of the spigot 7; the heavy drip segments 26, 26′ which contain the greatest number of perforations 15′ equally distributed between the two segments 26, 26′; the medium drip segments 27, 27′ which contain fewer perforations 15′ equally distributed between the two segments 27, 27′; and the light drip segments 28, 28′ which contain the least number of perforations 15′ equally distributed between the two segments 28, 28'. The remaining pair of oppositely extending segments 29, 29' are imperforate.

Figure 4:
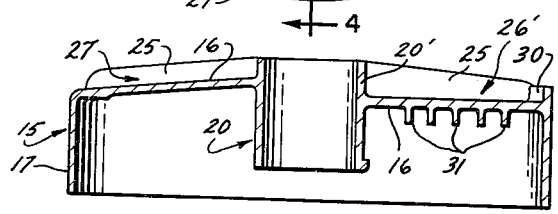
FIG. 4 is a sectional view of the liquid flow distributor and is taken substantially along the line 4—4 of FIG. 3.
Figure 5:
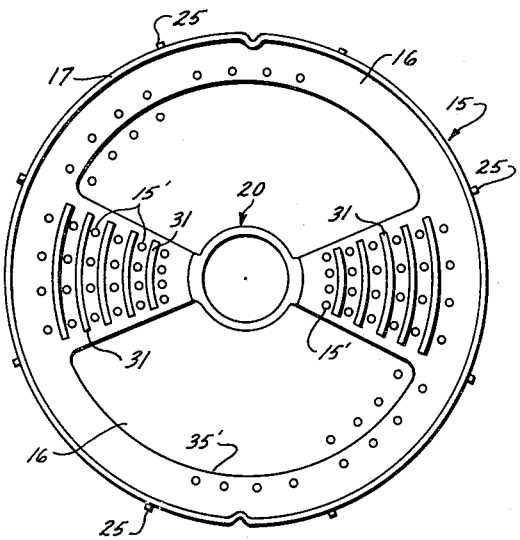
FIG. 5 is a bottom plan view of the liquid flow distributor.

As best seen in FIG. 4, the outer edge of each of the heavy drip segments 26, 26' is provided with an upwardly extending outer wall 30, and the plate portion 16 within the area of these segments 26, 26' extends in a horizontal plane. Thus, when liquid is pumped onto these segments 26, 26', it will be temporarily retained between the wall 20, radial walls 25 and outer walls 30 until it drips through the perforations 15' to be discharged onto the coffee grounds (not shown) in the basket B. If desired, and as shown in FIGS. 4 and 5, the under surface of the plate portion 16 in the area of the heavy drip segments 26, 26' is provided with radially spaced and circumferentially disposed ledges 31 between the rows of perforations 15' to assist in evenly distributing fluid passing through the perforations 15' over the coffee grounds below.

As best seen in FIG. 4, the plate 16 of distributor 15 inclines downwardly from wall 20, in the areas of the medium drip segments 27, 27', light drip segments 28, 28' and imperforate segments 29, 29'. Thus, because walls 25 extend beyond the outer edge of plate portion 16 to provide fluid paths around the basket B, fluid that does not pass through the perforations in segments 27, 27' or 28, 28' and which is pumped onto imperforate segments 29, 29', flows down the inclined areas of plate 16 and down the outside of wall 17 without passing through the coffee grounds.

In operation, liquid is circulated via the pump P through the tube T and the T spigot 7 which will direct the liquid in opposite radial directions upon the distributor 15. The setting of the knob 4 with reference to the pair of indices 6 on the dial D will predetermine the pair of liquid flow distributing segments onto which the water will be directed. When the user desires to brew strong coffee, the spigot 7 is turned to direct the spigot outlets 8, 8' to discharge the fluid upon the heavy drip segments 26, 26' where, as previously described, the fluid will be temporarily retained until it passes through the perforations 15'. When medium strength coffee is desired, the fluid is directed via the spigot 7 to discharge on the medium drip segments 27, 27' where it will pass downwardly along the inclined upper surfaces of the distributor 15 to partially pass through the perforations 15' and partially pass over the edge of the distributor to flow outboard of the basket B. Similarly, fluid directed to make a mild brew upon the light drip segments 28, 28' will partially flow outboard of the basket and partially through the perforations 15' in the segments 28, 28', but in greater and lesser proportions, respectively, than the flow division effected at the medium segments, because of the fewer number of perforations 15' in the light drip segments 28, 28'. The apparatus of this invention is preferably used in an electric percolator of the type wherein the heat to the pump is automatically shut off when a predetermined fluid temperature is obtained. Therefore, the same quantity of liquid will be discharged from the pump onto any selected pair of segments during the brewing operation which will result in the desired strength of the brew according to the segments chosen.

When it is desired to reheat the coffee brew after it has cooled, the user, by using the indicator knob 4 on the cover C, may rotate the T spigot 7 by rotating the knob 4 to the "reheat" position to dispose the spigot outlets 8, 8' over the imperforate segments 29, 29'. Energizing the pump P causes the brew to be recirculated to discharge upon the continuous segments 29, 29' which direct the brew entirely around the coffee basket B so that the strength of the brew will be unaffected by the coffee grounds while reheating to the desired drinking temperature. This reheating is fast and efficient since it utilizes the pump heat source.

The invention then provides liquid distributing apparatus for a percolator or the like which will permit the user of the percolator to rapidly reheat cooled coffee without removing or otherwise touching the coffee grounds and which will also permit the initial predetermining of the strength of the coffee to be brewed by positioning the apparatus to direct more or less of the circulated liquid through the coffee grounds. The apparatus is arranged to be positioned readily and easily by the simple operation of a single control disposed externally of the coffee maker.

As will be apparent to persons skilled in the art, various modifications and adaptations of the structure above described will become readily apparent without departure from the spirit and scope of the invention, the scope of which is defined in the appended claims.

I claim:

1. In a percolator or the like, a coffee basket, means for pumping liquid to a position above said basket, and a liquid flow distributor interposed between said means and said coffee basket, said distributor comprising a plate dimensioned for covering the upper end of the coffee basket, a plurality of radially extending and circumferentially spaced walls extending upwardly from said plate and forming a plurality of pairs of oppositely and radially extending fluid flow segments therebetween, said plate being imperforate in the areas of one said pair of segments, said plate being formed with perforations in the areas of the other of said pairs of segments, said means for pumping liquid including means for discharging liquid solely onto one pair of opposed radially extending segments.

2. In a percolator or the like, a coffee basket, means for pumping liquid to a position above said basket, and a liquid flow distributor interposed between said means and said coffee basket, said distributor comprising a plate dimensioned for covering the upper end of the coffee basket, a plurality of circumferentially spaced and radially extending walls extending upwardly from said plate and forming a plurality of pairs of oppositely and radially extending fluid flow segments therebetween, said plate being formed with an equal number of perforations in the areas of the segments of one said pair of segments, end walls extending upwardly from said plate at the outer and inner edges of each segment of said one pair of segments and connecting the ends of said radially extending walls on either side thereof, said plate being imperforate in the area of a second pair of segments, said plate being formed with consecutively fewer perforations than said first mentioned number of perforations in the areas of the segments of the remaining said pairs of segments, said means for pumping liquid including means for discharging liquid solely onto one pair of opposed radially extending segments.

3. In a percolator or the like, a coffee basket, means for pumping liquid to a position above said basket, and a liquid flow distributor interposed between said means and said coffee basket, said distributor comprising a plate dimensioned for covering the upper end of the coffee basket, a plurality of circumferentially spaced and radially extending walls extending upwardly from said plate and forming a plurality of pairs of oppositely and radially extending fluid flow segments therebetween, said plate being formed with an equal number of perforations in the areas of the segments of one said pair of segments, and extending in a substantially horizontal plane, end walls extending upwardly from said plate at the outer and inner edges of each segment of said one pair of segments and connecting the ends of said radially extending walls on either side thereof, said plate being imperforate in the area of a second pair of segments, said plate being formed with consecutively fewer perforations than said first mentioned number of perforations in the areas of the segments of the remaining said pairs of segments, said plate in the area of said second pair of segments and said remaining pairs of segments being inclined radially downwardly, said means for pumping liquid including means for discharging liquid solely onto one pair of opposed radially extending segments.

4. In a percolator or the like, a coffee basket, a vertical fountain tube extending through and above said coffee basket and providing means at its upper end for discharging liquid solely in opposite radial directions, said means being rotatable within said percolator in a horizontal plane, and a liquid flow distributor interposed between said means and said basket, said distributor comprising an annular plate surrounding said fountain tube and dimensioned to overlie and cover said coffee basket, a plurality of circumferentially spaced and radially extending walls extending upwardly from said plate and past the outer circular edge of said plate to maintain said plate and the inner walls of said percolator in radial spaced relation, said radially extending walls forming a plurality of pairs of oppositely and radially extending fluid flow segments therebetween, said plate being formed with an equal number of perforations in the areas of the segments of one said pair of segments, and extending in a substantially horizontal plane, end walls extending upwardly from said plate at the outer and inner edges of each segment of said one pair of segments and connecting the ends of said radially extending walls on either side thereof, said plate being imperforate in the area of a second pair of segments, said plate being formed with consecutively fewer perforations than said first mentioned number of perforations in the areas of the segments of the remaining said pairs of segments, said plate in the area of said second pair of segments and said remaining pairs of segments being inclined radially downwardly.

5. In a percolator or the like, a source of pumped liquid, a coffee basket, a cover for closing the top of the percolator and having a depending cylindrical wall, selective means mounted in said cover for rotation in a horizontal plane and extending externally of the percolator, fluid discharge means connecting said selective means for rotation thereby and extending beneath said cover, said fluid discharge means providing a pair of oppositely and radially extending fluid outlets, a vertically disposed fluid inlet provided by said fluid discharge means and extending vertically for detachably connecting said source of pumped liquid, an annular fluid distributor plate surrounding said fluid inlet below said cover and providing a depending cylindrical wall radially inwardly spaced from said wall of said cover, said distributor plate covering the upper end of said coffee basket, complementary indentation means provided on said cover and on said fluid distributor plate and preventing relative rotation of said cover and said plate in a horizontal plane, said fluid distributor plate providing a plurality of oppositely and radially extending walls extending upwardly therefrom and outwardly to maintain said plate and cover in radial spaced relation and forming at the upper surface of said distributor a plurality of pairs of oppositely and radially extending fluid flow segments, said distributor plate being imperforate in the area of one said pair of segments, said distributor plate being formed with perforations in the areas of the other said pairs of segments, the number of said perforations in said plate in the areas of said other pairs of segments varying from one said other pair to the next.

References Cited in the file of this patent

UNITED STATES PATENTS

| | | |
|---|---|---|
| 590,429 | Burckard | Sept. 21, 1897 |
| 1,389,299 | Gardiner | Aug. 30, 1921 |
| 1,403,724 | Williams | Jan. 17, 1922 |